J. A. FRIES.
AUTOMATIC GAS ANALYSIS APPARATUS.
APPLICATION FILED NOV. 17, 1917.

1,309,681.

Patented July 15, 1919.
2 SHEETS—SHEET 1.

Inventor
JÖNS AUGUST FRIES
By Ross H. Read
his Attorney

J. A. FRIES.
AUTOMATIC GAS ANALYSIS APPARATUS.
APPLICATION FILED NOV. 17, 1917.

1,309,681.

Patented July 15, 1919.
2 SHEETS—SHEET 2.

Inventor
JÖNS AUGUST FRIES

By Robt. H. Read
his Attorney

UNITED STATES PATENT OFFICE.

JÖNS AUGUST FRIES, OF STATE COLLEGE, PENNSYLVANIA.

AUTOMATIC GAS-ANALYSIS APPARATUS.

1,309,681.      Specification of Letters Patent.      Patented July 15, 1919.

Application filed November 17, 1917. Serial No. 202,462.

*To all whom it may concern:*

Be it known that I, JÖNS AUGUST FRIES, a citizen of the United States, residing at State College, in the county of Center and State of Pennsylvania, have invented new and useful Improvements in Automatic Gas-Analysis Apparatus, of which the following is a specification.

My invention relates to an improved apparatus for the analysis of a gas mixture for any gas which can be absorbed by coming in contact with suitable chemical compounds. Its more particular use is for the determination of carbon dioxid or aqueous vapor present in a gas mixture and is intended for ordinary laboratory and research work, where the percentages of the gases in question are not very high, but where greater accuracy is required than is usual with apparatus intended chiefly for flue gases, but may also be used for the latter purpose.

In my apparatus the gas sample is taken and displaced by means of mercury and hence the gas mixture to be analyzed does not need to be saturated, but may be either in normal moisture condition, or dry, which is not possible where other displacing medium than mercury is used.

The principles involved in the use of my invention are the ones usually applied to this class of gas analyses, namely, sampling by means of displacement by a suitable liquid or piston, absorption of the gas in question by contact with an absorbing substance either solid or in solution, and the volume of the gas thus absorbed measured or in some way its volume is indicated.

My invention comprises simple and novel means for obtaining a predetermined volume of any gas mixture for analysis, an absorber system, means for forwarding the gas sample through the absorber, and means for indicating in percent the volume of gas removed from the sample. No automatic recording device is used on the apparatus when the greatest accuracy is desired, but a suitable self-recording device may be attached to the apparatus at the discharge end and may be used alone or together with the indicating manometer.

The characteristic features of my invention are set forth in the accompanying drawings.

Figure 3:
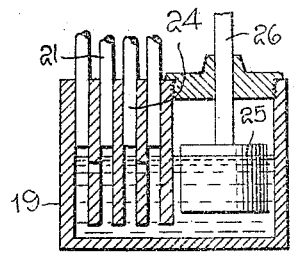
Fig. 3 is a vertical cross section of mercury valve 19 showing air channels.
Figure 4:
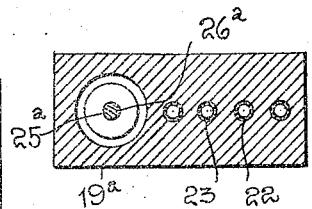
Fig. 4 is a horizontal cross section of the mercury valve 19$^a$.
Figure 2:
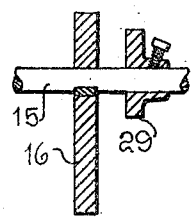
Fig. 2 shows relative positions, end view, of two cams on the same shaft.
Figure 1:
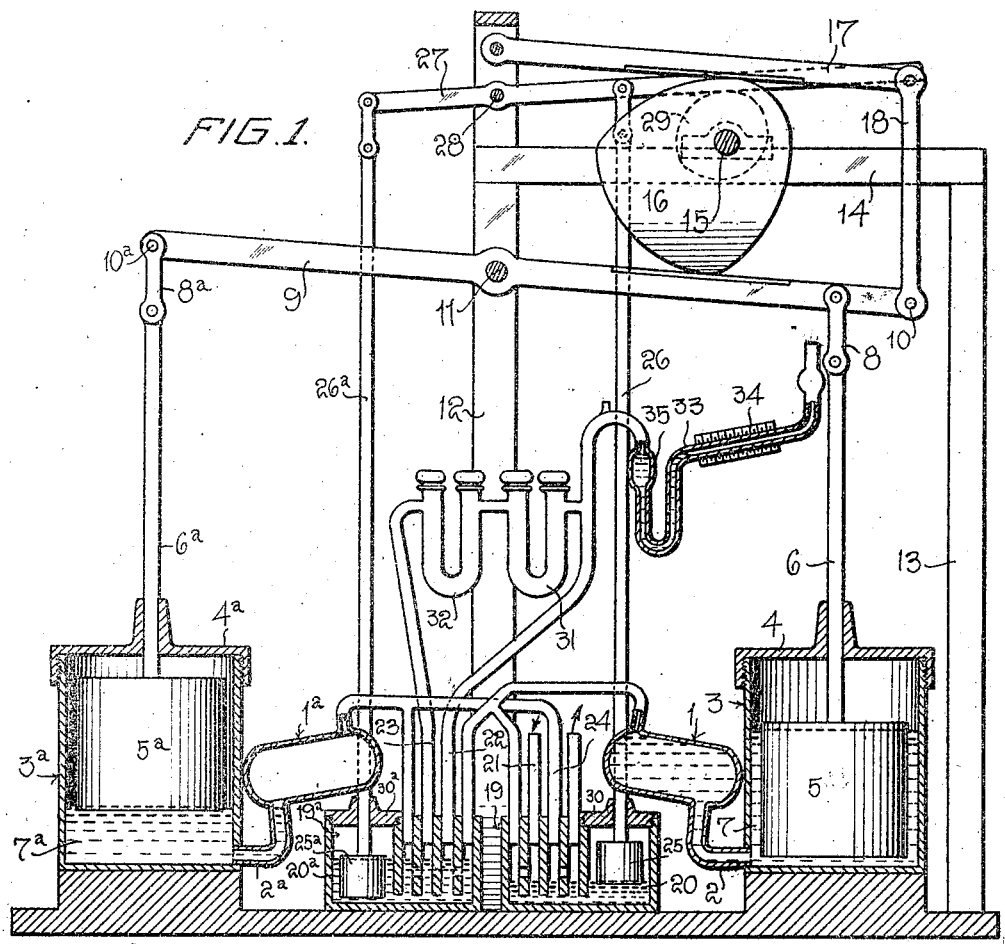
Figure 1 is a sectional side elevation of the mechanism used for taking a fixed volume of the gas mixture to be analyzed and for moving and measuring this sample during the determination of the particular gas in question until the residue of gases is again expelled.

In Fig. 1, 1 and 1$^a$ are two measuring bulbs of like volume and of similar shape, 1 measuring the gas sample before and 1$^a$ at the end of the determination. These bulbs connect by ducts 2 and 2$^a$ with two iron cylinders, or wells 3 and 3$^a$ holding mercury. These wells are of like diameter and volume, and are finished smooth on the inside. 4 and 4$^a$ are cylinder heads which are fastened on securely and serve as guides for the piston rods. 5 and 5$^a$ are two loose fitting pistons, or plungers, which are rigidly fastened to the rods 6 and 6$^a$. This rigid arrangement of the rods and the guide of the cylinder heads makes it possible to operate the pistons in the mercury 7 and 7$^a$ without any difficulty. 8 and 8$^a$ are two piston rod joints which connect the pistons 5 and 5$^a$ to the rigid beam 9 at predetermined points 10 and 10$^a$ equidistant from the fulcrum 11. 12 is the post supporting the beams, and 13 is the end post. 14 is a cross piece connecting 12 and 13 and serving as a hanger or bearing for the shaft 15. On 15 is a cam 16, of predetermined shape and size, which operates on the beam 9. This cam is so constructed that it gives intermittent up and down motions to the beam. This is brought about by having on the cam the two opposite quarters of its periphery true circular segments of different radius, so that while these sections are in contact with the beam it remains stationary. In order to move the pistons up and down by one cam, a second beam 17 is joined by joint 18 to beam 9 in such manner that the two beams always remain in touch with the cam and parallel to each other, and the cam 16 thus operates on the upper side of one and on the under side of the other beam. This up and down movement of the pistons causes the mercury to act as pump pistons pumping gas mixtures in and out of the two measuring bulbs.

19 and 19$^a$ are two mercury valves which consist of two wells 20 and 20$^a$ for mercury, four pairs of specially arranged ducts 21, 22, 23 and 24, and two plungers 25 and 25$^a$. By means of the rods 26 and 26$^a$ the plungers are connected to a beam 27 equi-distant from the fulcrum 28. This beam is operated by cam 29, which is driven by the shaft 15. On the wells are tight fitting covers 30 and 30$^a$ which serve as guides for the plunger rods; as the beam 27 extends considerably beyond the cam, its preponderant weight overcomes the resistance of the mercury to the plungers and holds the beam against the cam.

The absorbing system consists (when carbon dioxid is the gas to be determined) of two glass-stoppered U-tubes 31 and 32, the first being filled with granulated soda-lime, and the other with small sized pumice-stone saturated with sulfuric acid. The measuring bulb 1$^a$ and the absorption tubes communicate as indicated by the connection tubes with each other and with a specially constructed manometer 33. The manometer may have colored water or some mobile oil as an indicator. The end of the liquid column is read off on the scale 34, the difference in length of the column giving the per cent. of gas absorbed. The manometer tube which is connected to a reservoir 35 is of small bore, about one-eighth of an inch, and is placed in a nearly horizontal position. To safeguard blowing out the liquid by sudden changes of pressure, the ends are bent in opposite directions and made long enough for the water column to exceed the mercury resistance in the valves. The excess of gas pressure will be relieved through the mercury valves, instead of through the manometer.

The whole apparatus is operated through shaft 15, and any power may be used which can give to the shaft the desired slow and steady motion. A small electric motor (not shown), with worm gear reducing the speed, is a most desirable source of power. By attaching a crank to the shaft 15 the apparatus can also be operated by hand.

When the mechanism is in continuous operation the manometer readings must be taken quickly at the proper moment, but the apparatus may also be started and stopped for each determination.

The mode of operating the apparatus is as follows: By any convenient method the gas mixture to be analyzed is brought in close proximity to the apparatus so as to avoid long connections, and the portion to be measured out for analysis is purified, dried, or prepared in any way desired before entering the apparatus. A drying tower with fine pumice-stone and sulfuric acid, not shown on the drawings, is used when gas is to be freed from moisture. Fig. 1 shows the apparatus in position ready to take a sample of gas for analysis. Piston 5 is down, the bulb 1 is full of mercury and bulb 1$^a$ contains a previous sample already analyzed and ready to be discharged. The mercury valves have been shifted so that the inlet and outlet channels 21 and 24 are open. When the rotation of the cam 16 causes the beam to lift piston 5 the gas sample enters bulb 1 at the same time the old sample is being discharged from the bulb 1$^a$. When the beam has reached its full stroke it remains stationary for a period, during which time the mercury valves are reversed by the action of the cam 29, closing the inlet and outlet tubes and opening the communication between the two bulbs 1 and 1$^a$ and absorption apparatus. As the beam 9 reverses its stroke the sample is driven through the absorption tubes into bulb 1$^a$. As the beam 9 reaches its full stroke and becomes stationary the liquid in the manometer will indicate the amount of gas removed by absorption. The mercury valves are again reversed, and thus one complete revolution of the cams brings the apparatus to its starting point again ready for the next sample.

Figure 5:
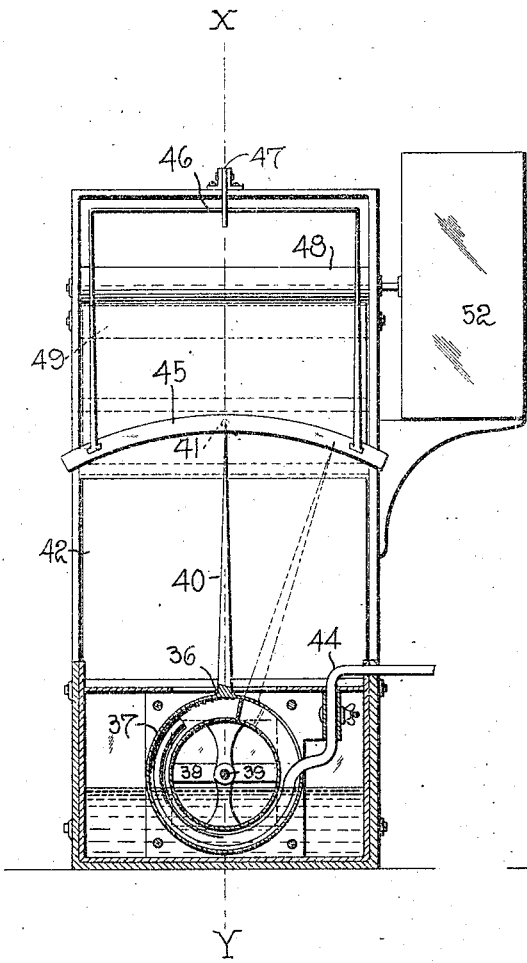
Fig. 5 illustrates a recording apparatus for automatically registering a varying carbon dioxid content.
Figure 6:
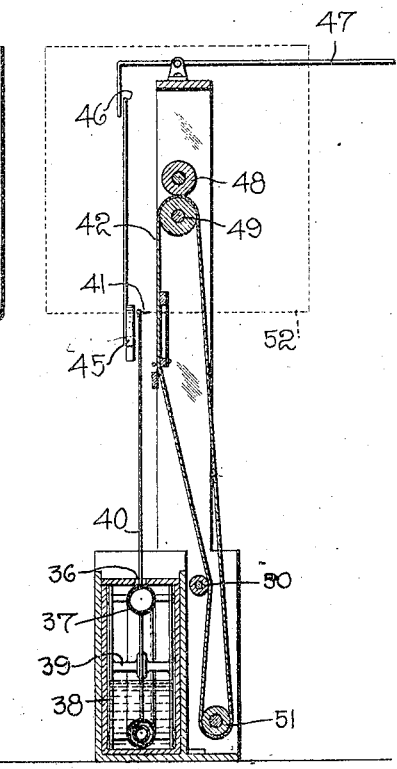
Fig. 6 is a sectional view of Fig. 5 on line X—Y.

The automatic recording device, which at any time may be used instead of or in connection with the manometer, records the difference in pressure of the gas sample after a determination by punctures made by a pointer on record paper. The preferred type of recorder is shown in detail in Figs. 5 and 6, and consists of a circular tube 37 which has one air-tight cross-partition, and which is supported in a frame 38 where it rotates freely on its shaft 39. On the upper edge of this circular tube is secured a pointer 40 which carries at its upper end at right angles to its axis a sharp point 41, as shown in Fig. 6, for puncturing the record paper 42. Through a slot in the circular tube 37 is introduced a tube 44 which is firmly fastened to a frame supporting it, and is so spaced that it does not touch the sides of the tube 37 surrounding it. This tube at its end connects with, as indicated in Fig. 1, the manometer tube; its connecting pipe may be controlled by a pinch-cock or stopcock so that the recorder may be used simultaneously, or independently when the highest degree of accuracy is desired. The tube 37 rests in a vessel which is filled with a liquid to a point below the shaft 39. The pointer 40 is driven into the slowly moving record paper by means of a long, bent tapper 45 which has a shape corresponding to the arc described by the pointer, and is hinged at a point 46. To give this tapper a striking motion, a tripper 47 pulls it away from the point and on release, the point is driven into the paper. The tripper arm is extended to engage the shaft 15, Fig. 1, so as to be operated at the proper moment to make the record. The record paper is pulled between rollers 48 and 49, and passes over rollers 50, 51, being guided in a slot to hold it true near the recording point. The power for operating the rollers is furnished by clockwork, as indicated at 52.

The sensitiveness of the recorder results from the carefully balanced circular tube 37, which can rock back and forth a definite arc, free from friction or torsional strain; thus any change of gas pressure in the manometer pipe will cause the circular tube to change position, and leave a permanent record. The pointer normally is in a vertical position, but a change of pressure in the manometer tubes would effect a movement of the pointer to the right or left with an increase or decrease of gas pressure.

Having thus described my invention, what I claim is:

1. A gas analysis apparatus comprising a pair of similar capacity gas measuring bulbs, two mercury valves connecting with each, a pump for establishing communication and leading a gas through the apparatus at determinate intervals, a chamber for an absorbent of a desired gas constituent, and an indicator of the amount of gas absorbed.

2. A gas analysis apparatus comprising a pair of similar capacity measuring bulbs, two mercury valves in train therewith each having ingoing and outgoing gas channels, a pump to open and close communication of gas with the bulbs and the external air or gas at definite intervals, an absorbing vessel for a desired gas constituent, and an indicator of the amount of gas absorption.

3. A gas analysis apparatus comprising a pair of similar capacity measuring bulbs, two mercury valves in train therewith, each of said valves containing air channels communicating with the measuring bulbs and with each other in pairs, a mercury pump having a plunger to open and close gas movement through the bulbs at intervals, and a power driven cam to operate the pump.

4. A gas analysis apparatus comprising a pair of similar capacity measuring bulbs, a pair of mercury valves with ducts controlling movement of gas between the bulbs and each other, a mercury pump for filling one bulb with gas and simultaneously expelling gas from the other, means for absorbing a desired constituent of the gas, and a percentage indicator of the absorbed constituent.

5. A gas analysis apparatus comprising a pair of similar capacity measuring bulbs, a mercury pump containing a pair of cylinders and pistons for moving a gas sample, parallel motion beams to actuate at intervals the pistons, mercury valves establishing communication with the bulbs, and a power-driven cam having a dwell in its contour to effect periods of rest in gas movement.

6. A gas analysis apparatus comprising a pair of similar capacity gas measuring bulbs, a container for gas absorbing and dessicating materials in granulated form to offer no resistance to gas movement and for drying the residual gas, and means for indicating changes of pressure due to absorption.

JÖNS AUGUST FRIES.